US009691344B2

(12) United States Patent
Ota

(10) Patent No.: US 9,691,344 B2
(45) Date of Patent: Jun. 27, 2017

(54) LIQUID CRYSTAL DISPLAY DEVICE HAVING A MASTER AND SLAVE DRIVERS AND DRIVING METHOD THEREOF

(71) Applicant: Japan Display Inc., Tokyo (JP)

(72) Inventor: Jin Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 36 days.

(21) Appl. No.: 14/811,437

(22) Filed: Jul. 28, 2015

(65) Prior Publication Data

US 2016/0035308 A1 Feb. 4, 2016

(30) Foreign Application Priority Data

Jul. 31, 2014 (JP) ................................ 2014-156679

(51) Int. Cl.

*G06F 3/038* (2013.01)
*G09G 5/00* (2006.01)
*G09G 3/36* (2006.01)
*G09G 5/18* (2006.01)

(52) U.S. Cl.

CPC ......... *G09G 3/3696* (2013.01); *G09G 3/3688* (2013.01); *G09G 5/18* (2013.01); *G09G 2300/0408* (2013.01); *G09G 2300/0426* (2013.01); *G09G 2300/0495* (2013.01); *G09G 2330/026* (2013.01); *G09G 2330/12* (2013.01); *G09G 2370/08* (2013.01)

(58) Field of Classification Search

CPC .............................. G09G 3/3696; G09G 5/18
USPC ................................................ 345/211–213
See application file for complete search history.

(56) References Cited

U.S. PATENT DOCUMENTS

2002/0080109 A1* 6/2002 Nagata ................ G09G 3/3648 345/92
2014/0125564 A1* 5/2014 Je ............................ G09G 3/20 345/55
2015/0269900 A1* 9/2015 Iwamoto ............. G09G 3/3648 345/100

FOREIGN PATENT DOCUMENTS

| | | | |
|---|---|---|---|
| JP | 06-082750 | | 3/1994 |
| JP | 2001-324967 | | 11/2011 |
| JP | 2013-134265 | | 7/2013 |
| WO | WO 2014/061574 | * | 4/2014 |

* cited by examiner

*Primary Examiner* — Long D Pham
(74) *Attorney, Agent, or Firm* — K&L Gates LLP

(57) ABSTRACT

According to one embodiment, a power reception section connects to the battery side, and receives supply of power, a detection section detects a singular state where a voltage of the battery side has fallen to a value less than or equal to a predetermined voltage value, a shifting section receives a detection output of the singular state from the detection section to thereby shift to singular control, and a driver connection section connects the plurality of drivers to each other. If the detection section in one of the liquid crystal display drivers has detected the singular state, the shifting section executes the singular control, and the driver connection section notifies the other liquid crystal display drivers that the singular state has been detected.

9 Claims, 10 Drawing Sheets

LIQUID CRYSTAL DISPLAY DEVICE HAVING A MASTER AND SLAVE DRIVERS AND DRIVING METHOD THEREOF

CROSS REFERENCES TO RELATED APPLICATIONS

The present application claims priority to Japanese Priority Patent Application JP 2014-156679 filed in the Japan Patent Office on Jul. 31, 2014, the entire content of which is hereby incorporated by reference.

FIELD

Embodiments described herein relate generally to a liquid crystal display device including a plurality of liquid crystal display drivers, and driving method of the same.

BACKGROUND

A portable device (smartphone, personal digital assistant (PDA), tablet computer or the like) includes a liquid crystal display device. The liquid crystal display device includes an array substrate (may be referred to as a first substrate) and counter substrate (may be referred to as a second substrate), and a liquid crystal layer is formed between the first substrate and second substrate. This configuration is referred to as a liquid crystal display panel in some cases.

The first substrate includes a plurality of pixel circuits arranged in a matrix form. A pixel circuit is formed in the vicinity of an intersection of a gate line (or may be referred to as a scanning line) and source line (or may be referred to as a signal line). When a pixel circuit is selected by a gate signal supplied to the gate line, a pixel signal supplied from the source line is written to the pixel circuit.

The gate signal is output from a gate circuit formed on the first substrate to the gate line, and a source signal is output from a source selection circuit formed on the first substrate to the source line. Incidentally, as an element configured to control the operation timing of each of the gate circuit and source selection circuit, and supply a source signal to the source selection circuit, a liquid crystal display driver is utilized. This liquid crystal display driver is constituted as one semiconductor chip.

The above-mentioned liquid crystal display driver, i.e., the semiconductor chip includes an oscillator, timing controller, and the like in addition to a panel control signal generation circuit. Further, the semiconductor chip can drive a liquid crystal display panel according to a sequence of the timing controller.

Recently, image resolution enhancement of the liquid crystal display panel of a portable device is desired. For example, a liquid crystal display panel capable of displaying an image called 4K2K having 3840 pixels in the horizontal direction, and 2160 pixels in the vertical direction is desired. Further, there is a strong possibility of a device capable of displaying a super-high-resolution image called 8K4K having 7680 pixels in the horizontal direction, and 4320 pixels in the vertical direction being desired.

Further, in order to drive a liquid crystal display panel configured to display a super-high-resolution image, it becomes necessary to make various improvements in the function of the liquid crystal display driver. That is, being capable of driving the liquid display panel at high speed, and being capable of supplying source signals (R, G, B signals) in which the number of bits, and number of pixels are enormously increased because of the high resolution of the liquid crystal display panel to the liquid crystal display panel.

However, there is a limit to realizing a liquid crystal display driver that satisfies the above requirements by using one semiconductor chip in terms of the integration technique. Thus, a method for driving a liquid crystal display panel by using a plurality of liquid crystal display drivers (semiconductor chips), and operating the liquid crystal display drivers in parallel with each other is now investigated.

SUMMARY

This application relates generally to a liquid crystal display device and a driving method of a liquid crystal display device.

In an embodiment, a liquid crystal display device is provided, including a plurality of liquid crystal display drivers, each of the plurality of liquid crystal display drivers comprising a power reception section electrically connected to a battery side, and configured to receive supply of power; a detection section configured to detect a singular state where a voltage of the battery side has fallen to a value less than or equal to a predetermined voltage value; a shifting section configured to receive a detection output of the singular state from the detection section to thereby shift to singular control; and a driver connection section configured to electrically connect the plurality of drivers to each other, wherein, if the detection section in one of the liquid crystal display drivers has detected the singular state, the shifting section corresponding to the detection section executes the singular control, and the driver connection section corresponding to the detection section notifies the other liquid crystal display driver that the singular state has been detected to thereby cause the singular control of the other driver to be started.

In a further embodiment, a driving method of a liquid crystal display device is provided, wherein each of a plurality of liquid crystal display drivers comprises a power reception section configured to receive a power supply from a battery side, a detection section configured to detect a singular state, a shifting section, and a driver connection section configured to electrically connect the plurality of liquid crystal display drivers to each other, the method comprising in one of the liquid crystal display drivers, receiving supply of power from the battery side; detecting a singular state where a voltage of the battery side has fallen to a value less than or equal to a predetermined voltage value; executing, if a detection output of the singular state is received, singular control by the shifting section corresponding to the detection section, and notifying, by the driver connection section, the other liquid crystal display driver that the singular state has been detected to thereby cause the singular control of the other driver to be started.

In a further embodiment, a liquid crystal display device is provided, comprising a liquid crystal display panel in which two-dimensionally arranged pixel circuits are controlled by a source selection circuit, gate circuits, and a common electrode drive circuit; a plurality of liquid crystal display drivers electrically connected to a battery side to receive a power supply, and configured to drive the liquid crystal display panel; and an application processor configured to supply video data, and a synchronization signal to the plurality of liquid crystal display drivers, wherein each of the plurality of liquid crystal display drivers includes a power reception section electrically connected to the battery side, and configured to receive the power supply, a detection section configured to detect a singular state where a voltage of the battery side has fallen to a value less than or equal to a predetermined voltage value, a shifting section configured to receive a detection output of the singular state from the detection section to thereby shift to singular control, and a driver connection section configured to electrically connect the plurality of drivers to each other, and if, in one of the liquid crystal display drivers, the detection section has detected the singular state, the shifting section corresponding to the detection section executes the singular control, and the driver connection section notifies the other liquid crystal display driver that the singular state has been detected to thereby cause the singular control of the other driver to be started.

Additional features and advantages are described herein, and will be apparent from the following Detailed Description and the figures.

BRIEF DESCRIPTION OF THE FIGURES

FIG. 8 is a flowchart corresponding to the operation shown in FIG. 6, and shows an example of an operation sequence of a case where the master side and the slave side have been set in advance at the time of power-on.

DETAILED DESCRIPTION

Figure 1:
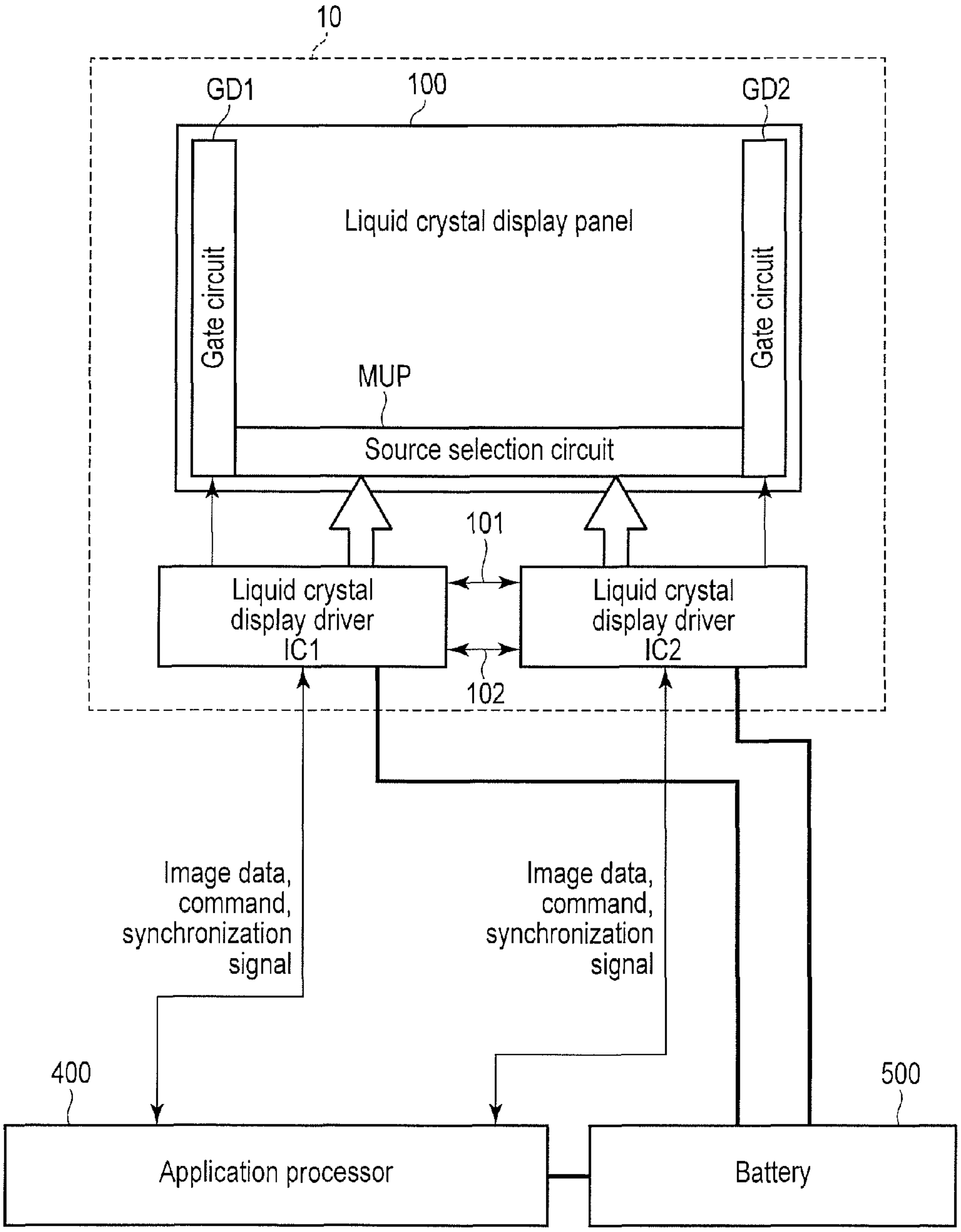
FIG. 1 is a block diagram showing the entirety of a portable device to which an embodiment is applied.

Various embodiments will be described hereinafter with reference to the accompanying drawings.

When carrying a portable device, the user drops the device in some cases. In such a case, the battery sometimes becomes detached from the portable device. In another case, the battery sometimes becomes displaced, causing poor contact between the battery and the terminals and leading to a temporary loss of the power supply voltage of the portable device. Further, when the battery is changed, the battery is detached from the portable device while the power of the portable device is on in some cases.

In such cases, the power supply voltage of the portable device abnormally falls, and a large difference in the power supply voltage is sometimes caused between a plurality of semiconductor chips. As a result, there is a possibility of a large current flowing between the semiconductor chips, thereby causing a failure or a breakdown of the internal circuit. Further, unwanted electric charge remains between electrodes of the liquid crystal panel, thereby causing pixel burn-in, failure or the like.

Further, when an unwanted and high-voltage charge remains in the liquid crystal panel, a backflow current or the like occurs, causing failure of an element in some cases. Further, when the battery becomes detached from the portable device, even if one liquid crystal display driver stops operation, the other liquid crystal display driver continues to operate for a while in some cases. In such a case, unless stop processing is immediately carried out, a large current flows, from the one liquid crystal display driver to the other, thereby causing destruction of the semiconductor chip in some cases.

Thus, an object of this embodiment is to provide a liquid crystal display device configured in such a manner that when the power supply voltage abruptly falls, a plurality of semiconductor chips, i.e., a plurality of liquid crystal display drivers used to drive the liquid crystal display panel, smoothly carry out singular operations, thereby making it possible to protect the circuits inside the drivers and liquid crystal panel, and a driving method of the liquid crystal display device.

According to one embodiment, a liquid crystal display device including a plurality of liquid crystal display, each of the plurality of liquid crystal display drivers comprising:

a power reception section electrically connected to the battery side, and configured to receive a power supply;

a detection section configured to detect a singular state where a voltage of the battery side has fallen to a value less than or equal to a predetermined voltage value;

a shifting section configured to receive a detection output of the singular state from the detection section to thereby shift to singular control; and a driver connection section configured to electrically connect the plurality of drivers to each other, wherein if the detection section in one of the liquid crystal display drivers has detected the singular state, the shifting section corresponding to the detection section executes the singular control, and the driver connection section notifies the other liquid crystal display driver that the singular state has been detected to thereby cause the singular control of the other driver to be started.

Hereinafter, this embodiment will be described more specifically. According to this embodiment, a plurality of liquid crystal display drivers drives the liquid crystal panel. Each of the liquid crystal display drivers includes at least a power reception section, detection section, shifting section, and driver connection section.

The power reception section is electrically connected to a battery to receive the supply of power. The detection section detects that the voltage of the power supply is in a singular state where the voltage has fallen to a value less than or equal to a predetermined voltage value. The shifting section receives a detection output of the singular state from the detection section to shift to singular control. The driver connection section electrically connects the plurality of drivers to each other. Further, when, in a first liquid crystal display driver, the detection section outputs a detection output of the singular state, the shifting section corresponding to the detection section executes the singular control, and notifies a second driver through the driver connection section that the singular state has been detected to thereby start the singular control of the second driver.

According to the above-mentioned configuration, even if the battery becomes detached from the portable device while the plurality of liquid crystal display drivers is driving the liquid crystal display panel, it is possible for the plurality of liquid crystal display drivers to shift all at once to singular control, e.g., an abnormal sequence operation. Thereby, it is possible to prevent burn-in of the liquid crystal panel from occurring, and prevent a failure or a breakage of the semiconductor circuit in the liquid crystal display driver from occurring.

Furthermore specifically, a description will be given with reference to the drawings. FIG. 1 is a block diagram showing the entirety of the portable device to which the embodiment is applied. The part of FIG. 1 surrounded by a broken line is an assembly called a liquid crystal display module 10.

In a liquid crystal display panel 100, a first substrate and a second substrate are opposed to each other, and a liquid crystal layer is provided between the first substrate and second substrate. A first gate circuit GD1 is arranged on the left side of the liquid crystal display panel 100, and a second gate circuit GD2 is arranged on the right side thereof. Further, a source selection circuit (also called a multiplexer in some cases) MUP is arranged in the lower area of the liquid crystal display panel 100.

A first liquid crystal display driver IC1 controls the first gate circuit GD1, and source selection circuit MUP, and can write pixel signals to pixels of the liquid crystal display panel 100 through the source selection circuit MUP. Further, also a second liquid crystal display driver IC2 controls the second gate circuit GD2 and the source selection circuit MUP, and can write pixel signals to pixels of the liquid crystal display panel 100 through the source selection circuit MUP.

It should be noted that although not shown, when pixel signals are written, a common electrode is given a common potential by the first liquid crystal display driver IC1 and the second liquid crystal display driver IC2. The common potential is supplied from, for example, the first liquid crystal display driver IC1 to the common electrode through common interconnect.

Basically, the first liquid crystal display driver IC1 and the second liquid crystal display driver IC2 respectively carry out mutual communication with an application processor 400, and carry out data request/reception independent of each other with the an application processor 400. However, the first liquid crystal display driver IC1 and the second liquid crystal display driver IC2 are connected to each other through a video synchronization signal line 101 so that video synchronization can be obtained. Further, the first liquid crystal display driver IC1 and the second liquid crystal display driver IC2 are connected to each other through a connection line 102. This connection line 102 is utilized, when a battery 500 falls off, in order to give instructions to each other so that the first and second liquid crystal display drivers IC1 and IC2 can shift to singular control.

The application processor 400 can supply image data, a command, synchronization signal and the like to the first liquid crystal display driver IC1 and the second liquid crystal display driver IC2.

The battery 500 supplies a power supply voltage to the application processor 400, and the first and second liquid crystal display drivers IC1 and IC2.

It should be noted that the first gate circuit GD1 drives, for example, odd-numbered gate lines, and the second gate circuit GD2 drives even-numbered gate lines. However, the first and second gate circuits GD1 and GD2 may synchronously drive identical gate lines.

Further, in the above embodiment, although the first and second liquid crystal display drivers IC1 and IC2 are shown, third and fourth liquid crystal display drivers may further be used.

Figure 2:
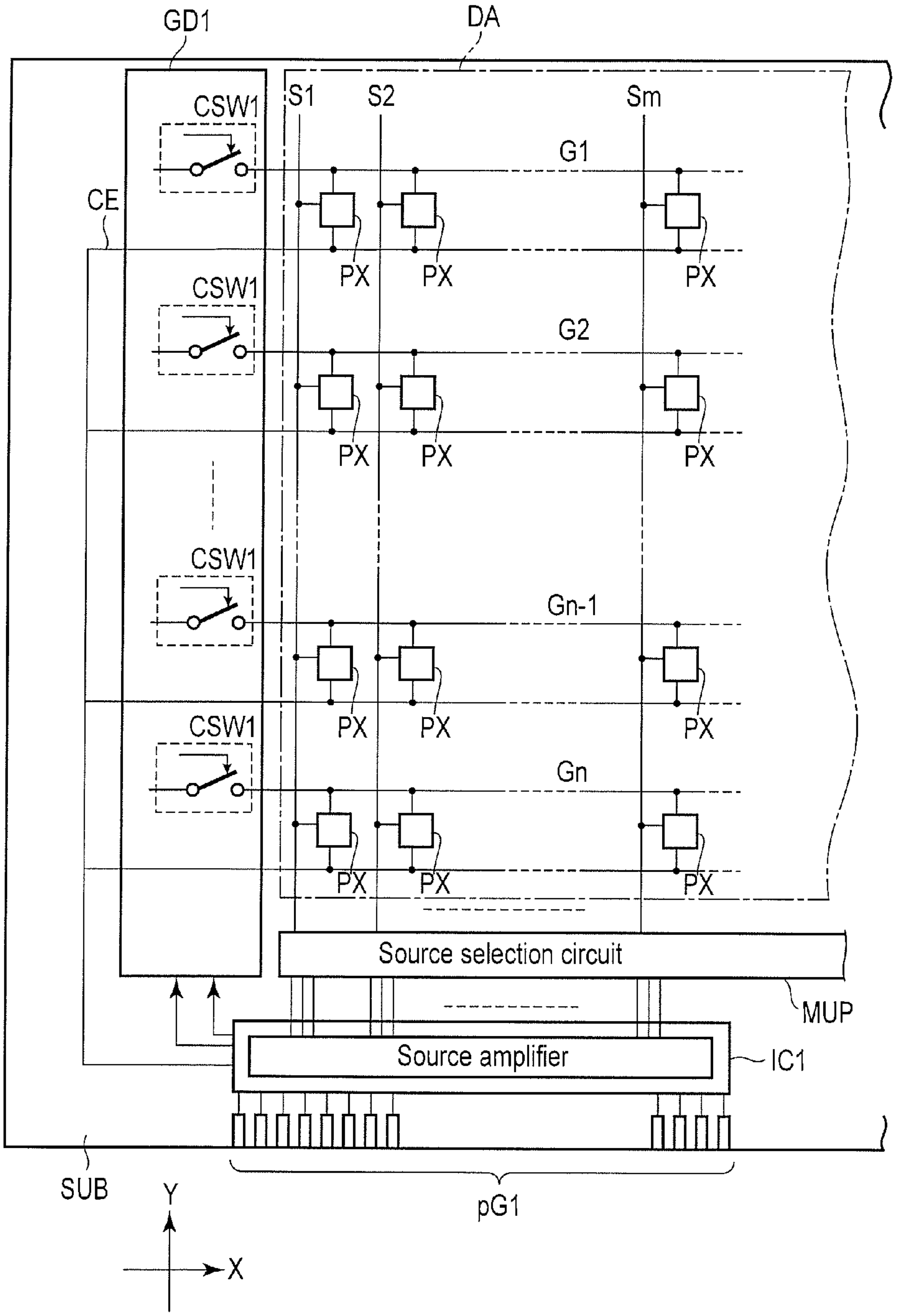
FIG. 2 is a view schematically showing the configuration and an equivalent circuit on the left side of a first substrate SUB1 on a liquid crystal display panel.

FIG. 2 is a view schematically showing the configuration and an equivalent circuit of the left side part of the first substrate SUB1 on the liquid crystal display panel 100.

The liquid crystal display panel 100 includes a display area (active area) DA configured to display an image. A backlight unit (not shown) is arranged on the back side of the first substrate SUB1. There are various configurations of the backlight units, and any one of configurations using a light-emitting diode (LED), cold cathode fluorescent lamp (CCFL) and the like as the light source may be used.

In the first substrate SUB1, the liquid crystal display driver IC1 is mounted on a non-display area on the outer side of the display area DA. Further, in the non-display area of the first substrate SUB1, the source selection circuit MUP, the gate circuits GD1 and GD2, and a pad group (hereinafter referred to as an OLB pad group) pG1 for outer lead bonding are formed.

The liquid crystal display driver IC1 is connected to the source selection circuit MUP, the gate circuit GD1, common electrode, and OLB pad group pG1. Although not entirely shown, the liquid crystal display driver IC1 and the gate circuits GD1 and GD2 (in FIG. 2, gate circuit GD1 is shown as a representative) are connected to each other through a control line configured to output a panel control signal. The liquid crystal display driver IC1 can supply the control signal to a control switching element CSW1 through the control line.

In the display area DA, a plurality of pixels PX are positioned between the first substrate SUB1 and the second substrate (not shown). The plurality of pixels PX are provided in a first direction X, and second direction Y in a matrix form in the number of m×n (m and n are positive integers).

In the display area DA, n gate lines G (G1 to Gn), m source lines S (S1 to Sm), and a common electrode CE are formed on the first substrate SUB1. A common potential is supplied to the common electrode CE from, for example, the liquid crystal display driver IC1 through the common interconnect.

The gate lines G extend substantially linear in the first direction X to be drawn out to the outside of the display area DA and connected to the gate circuit GD1. The gate lines G are arranged at intervals in the second direction Y. The gate lines G are connected to the control switching elements CSW1 on a one-to-one basis.

The source lines S extend substantially linear in the second direction Y to intersect the gate lines G. The source lines S are arranged at intervals in the first direction X. The source lines S are drawn out to the outside of the display area DA to be connected to the source selection circuit MUP. Further, the common electrode CE is provided to extend substantially linear in branches in the first direction X.

The common electrode CE is drawn out to the outside of the display area DA, and a common voltage output from the liquid crystal display driver IC1 is supplied thereto. It should be noted that the common electrode CE may also be connected to the liquid crystal display driver IC2, and it is sufficient if the common electrode CE is connected to at least one of these liquid crystal display drivers.

Further, the gate lines G, the source lines S, and the common electrode CE may not necessarily extend linear, and part of them may bend.

The gate circuit GD1 includes n control switching elements CSW1. Each of the n control switching elements CSW1 is selectively turned on or off, and can control permission of write or inhibition of write of a pixel signal to a corresponding pixel PX. Further, the n control switching elements CSW1 are turned on all at once in case of emergency (at the time of a singular control operation to be described later), and can permit write of a pixel signal of, for example, the black level to all the pixels PX.

The pixel signal is written to pixels connected to a selected gate line all at once through the source selection circuit MUP.

It should be noted that at the normal time, i.e., at the time of normal power-off, when the power supply voltage begins to fall or when the power supply voltage is sufficient, timing controllers 213 and 313 write pixel signals of the black level to the pixels while scanning the gate lines of the liquid crystal display drivers IC1 and IC2 in sequence about one to three lines at a time. Thereby, a large electric charge is prevented from remaining in a pixel electrode of each pixel.

Further, as the configurations in which the left and right gate circuits GD1 and GD2 drive the gate lines, various configurations can be realized. For example, there is a method in which the gate circuits GD1 and GD2 scan the gate lines of the whole display area in sequence while one gate line of the display area is being simultaneously driven from left and right by the gate circuits GD1 and GD2. Further, there is also a method in which the gate lines of the display area are divided into left and right areas, and the left and right gate circuits GD1 and GD2 respectively dive the gate lines in the left and right areas independent of each other. Furthermore, there is a method in which the left and right gate circuits GD1 and GD2 respectively drive odd-numbered gate lines and even-numbered gate lines of the display area independent of each other.

Figure 3:
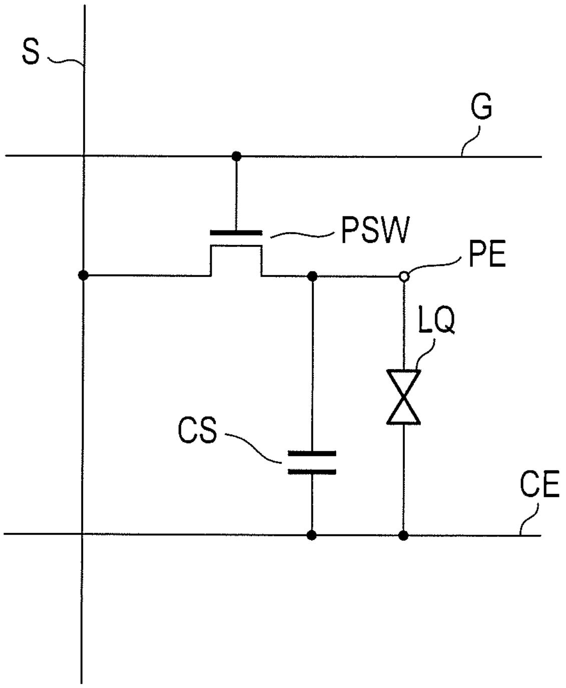
FIG. 3 is view showing an equivalent circuit of a pixel PX of FIG. 2.

FIG. 3 is an equivalent circuit showing a pixel PX shown in FIG. 2. The pixel PX includes a pixel switching element PSW, a pixel electrode PE, a common electrode CE and the like. The common electrode CE is connected to the common interconnect described previously. The pixel switching element PSW is constituted of, for example, a thin film transistor (TFT). The pixel switching element PSW is electrically connected to a gate line and source line. The pixel switching element PSW may be one of a top gate type TFT and bottom gate type TFT. Further, although the semiconductor layer of the pixel switching element PSW is formed of, for example, Polysilicon, a semiconductor layer may also be formed of amorphous silicon.

The pixel electrode PE is electrically connected to the pixel switching element PSW. The pixel electrode PE is opposed to the common electrode CE through an insulating film. The common electrode CE, the insulating film, and the pixel electrode PE constitute a retentive capacity CS. When a pixel signal is written to the retentive capacity CS, spatial light modulation of a liquid crystal LQ is realized by an electric field occurring between the pixel electrode PE and the common electrode according CE to the voltage of the retentive capacity CS.

Further, the common electrode CE is connected to the common interconnect shown in FIG. 2. The common electrode CE is formed by utilizing a material having optical transparency, for example, indium tin oxide (ITO). The common interconnect is formed by utilizing a material having excellent conductivity, for example, aluminum (Al).

Figure 4:
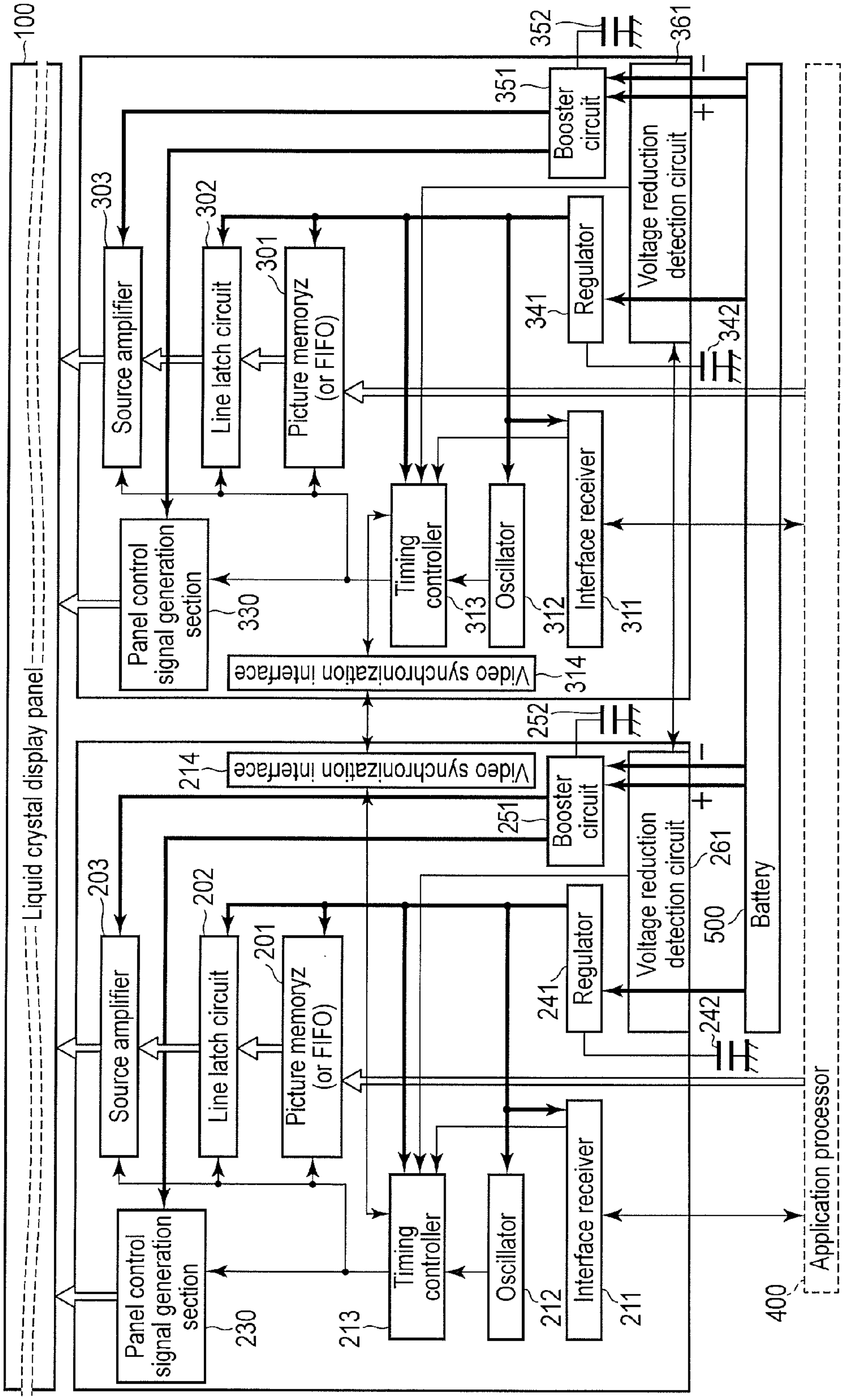
FIG. 4 is a view showing a block configuration example inside first and second liquid crystal display drivers that are two IC chips to which the embodiment is applied.

FIG. 4 shows a block configuration example inside the first and second liquid crystal display drivers IC1 and IC2 which are two IC chips. Both the first and second liquid crystal display drivers IC1 and IC2 have an identical configuration, and hence the configuration of the first liquid crystal display driver IC1 will be described below as a representative.

Image data from the application processor 400 is input to a picture memory 201. The image data read from the picture memory 201 is latched in a line latch circuit 202. The line latch circuit 202 can latch image data corresponding to one line or a plurality of lines of, for example, the left side area of the liquid crystal display panel 100.

Image data read from the line latch circuit 202 and corresponding to each pixel is subjected to digital-to-analog conversion by a source amplifier 203, and then to gamma correction or the like by an amplifier, and is written to the retentive capacity of the liquid crystal display panel 100.

A synchronization signal, a command and the like from the application processor 400 are captured by an interface receiver 211. The synchronization signal, the command and the like captured by the interface receiver 211 are input to the timing controller 213.

The timing controller 213 can set an operation mode and operation sequence of the liquid crystal display driver IC1 according to the command, or can carry out switching of operation modes and operation sequences according to the command. Further, the timing controller 213 can control the operation of the second liquid crystal display driver IC2 through a video synchronization interface 214 on the basis of the synchronization signal. That is, the timing controller 213 can synchronize processing operations of video data items of the first and second liquid crystal display drivers IC1 and IC2 with each other, and can synchronize video signal output operations of the first and second liquid crystal display drivers IC1 and IC2 with each other. The timing controller 213 generates various types of timing pulses on the basis of an internal clock from an oscillator 212 in order to realize the above-mentioned sequence.

Further, a reference timing pulse from the timing controller 213 is also supplied to a panel control signal generation section 230. The panel control signal generation section 230 generates various types of drive pulses used to drive the gate circuit, the source selection circuit and like in order to control the operation of the liquid crystal display panel 100 described previously on the basis of the reference timing pulse.

A power system is constituted inside the IC chip. In order to generate various power supply voltages, a regulator 241 and a booster circuit 251 are provided. In order to smooth and stabilize the output voltage, capacitors 242, and 252 are connected to the regulator 241 and the booster circuit 251, respectively. In FIG. 4, one capacitor is connected to each of the regulator 241, and the booster circuit 251. However, actually the regulator 241, and the booster circuit 251 each generate a plurality of power supply voltages, and hence a plurality of capacitors are connected to each of the regulator 241 and the booster circuit 251. Further, although a capacitor for boosting is also connected to the booster circuit 251, this capacitor is represented by the capacitor 252 for illustration.

A DC voltage of, for example, about 1.8V is input to the regulator 241 from the battery 500. The regulator 241 converts the voltage of 1.8V to a stabilized voltage of, for example, about 1.2V by a switching operation. This output voltage of the regulator 241 is a voltage suitable for an input/output section, logic circuit, and memory (RAM, S-RAM, and the like), and is input to a power supply line of each of the interface receiver 211, oscillator 212, picture memory 201, line latch circuit 202 and the like.

DC voltages of, for example, about ±5V are input to the booster circuit 251 from the battery 500. The booster circuit 251 further boosts the voltages to convert the voltages to stabilized voltages of about ±8V. The voltages are voltages suitable for panel drivers (source driver, and gate driver). Accordingly, the output voltages of the booster circuit 251 are supplied to power supply lines of the panel control signal generation section 230, the source amplifier 203 and the like.

Here, a voltage reduction detection circuit 261 configured to monitor the power supply voltage of the battery 500 is further provided. In FIG. 4, although one voltage reduction detection circuit 261 is shown for the regulator 241 and the booster circuit 251, a voltage reduction detection circuit corresponding to each of the regulator 241 and the booster circuit 251 may be provided independently.

Also the second liquid crystal display driver IC2 has a configuration identical to the first liquid crystal display driver IC1, and includes a picture memory 301, a line latch circuit 302, a source amplifier 303, an interface receiver 311, an oscillator 312, a timing controller 313, a panel control signal generation section 330, a video synchronization interface 314, a regulator 341, a booster circuit 351, a voltage reduction detection circuit 361, capacitors 342, and 352 and the like.

Figure 5:
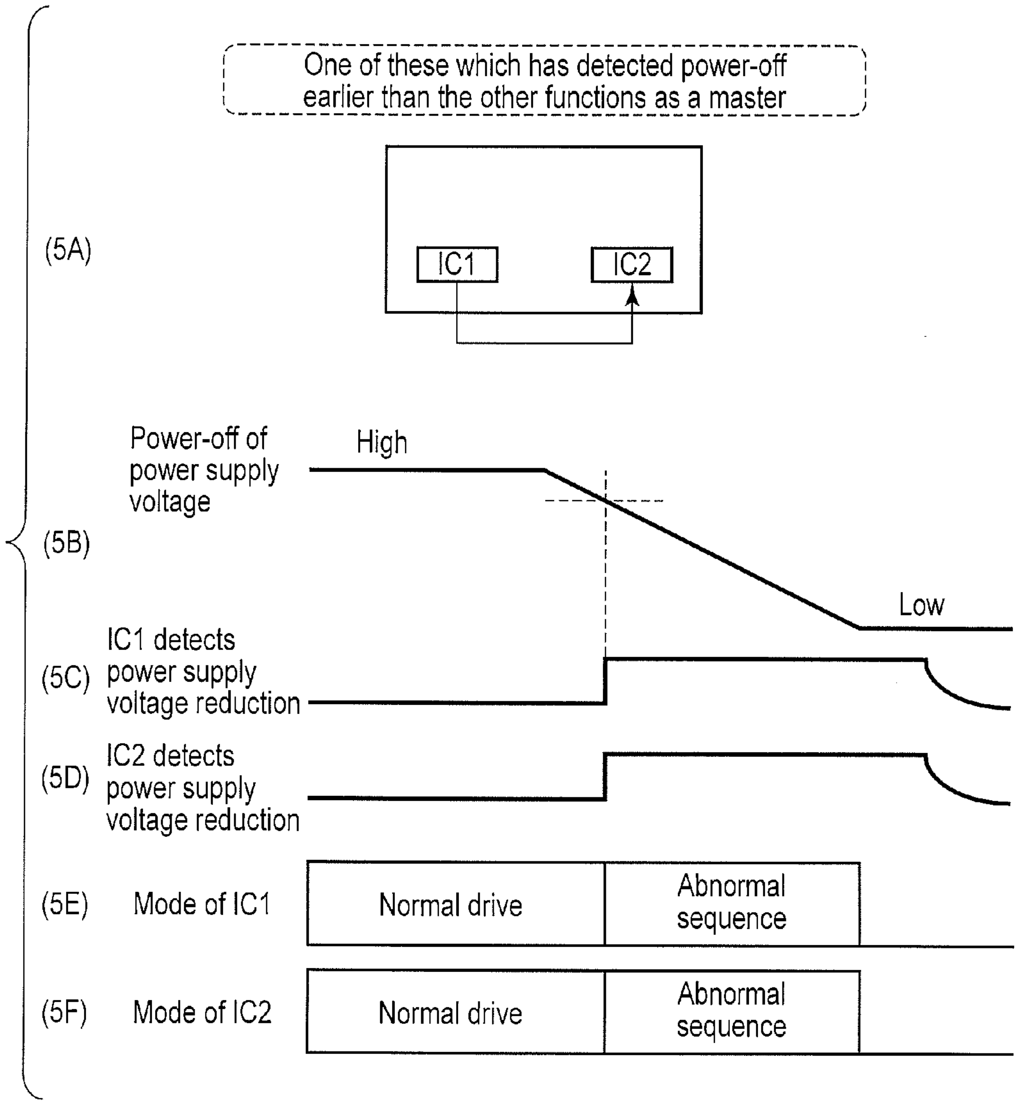
FIG. 5 is an operation explanatory view shown to explain one operation example in the embodiment.

FIG. 5 is an operation explanatory view shown to explain an operation example in the embodiment. FIG. 5(5A) shows the first liquid crystal display driver IC1 and the second liquid crystal display driver IC2. Further, FIG. 5(5A) shows an example in which the first liquid crystal display driver IC1 operates as a master, and the second liquid crystal display driver IC2 operates as a slave. Now, a state where the battery 500 has become detached, and the power supply voltage has fallen from the high value to the low value as shown in FIG. 5(5B) is shown. In FIG. 5, although one master and one slave are shown, a plurality of slaves may be present.

It is assumed as shown in FIG. 5(5C) that the first liquid crystal display driver IC1 has detected earlier than the second liquid crystal display driver IC2 that the power supply voltage has fallen. That is, this phenomenon implies that there is an individual difference between the two chips in the detection level of the power supply voltage reduction.

Then, the first liquid crystal display driver IC1 shifts from the normal drive mode to the abnormal sequence control in terms of the drive mode of the liquid crystal display panel as shown in FIG. 5(5E). Further, the first liquid crystal display driver IC1 notifies the second liquid crystal display driver IC2 of a singular state where the voltage of the battery has fallen to a value less than or equal to the predetermined voltage value. Then, as shown in FIG. 5(5D), and FIG. 5(F), the second liquid crystal display driver IC2 also shifts from the normal drive mode to the abnormal sequence control. In the abnormal sequence, a pixel signal of the black level is written to all the pixels PX all at once under the control of the timing controllers 213 and 313, and the control is executed in such a manner that a large electric charge does not remain in the pixel electrode.

In the above description, an example in which the first liquid crystal display driver IC1 operates as the master, and the second liquid crystal display driver IC2 operates as the slave has been described. However, there may be an opposite case. That is, the second liquid crystal display driver IC2 may operate as the master, and the first liquid crystal display driver IC1 may operate as the slave.

In the above embodiment, when the battery has become detached, any one liquid crystal display driver operates as the master, and the other liquid crystal display driver operates as the slave. However, the example is not limited to such an embodiment and, any one liquid crystal display driver may be set as the master at the time of power-on.

Figure 6:
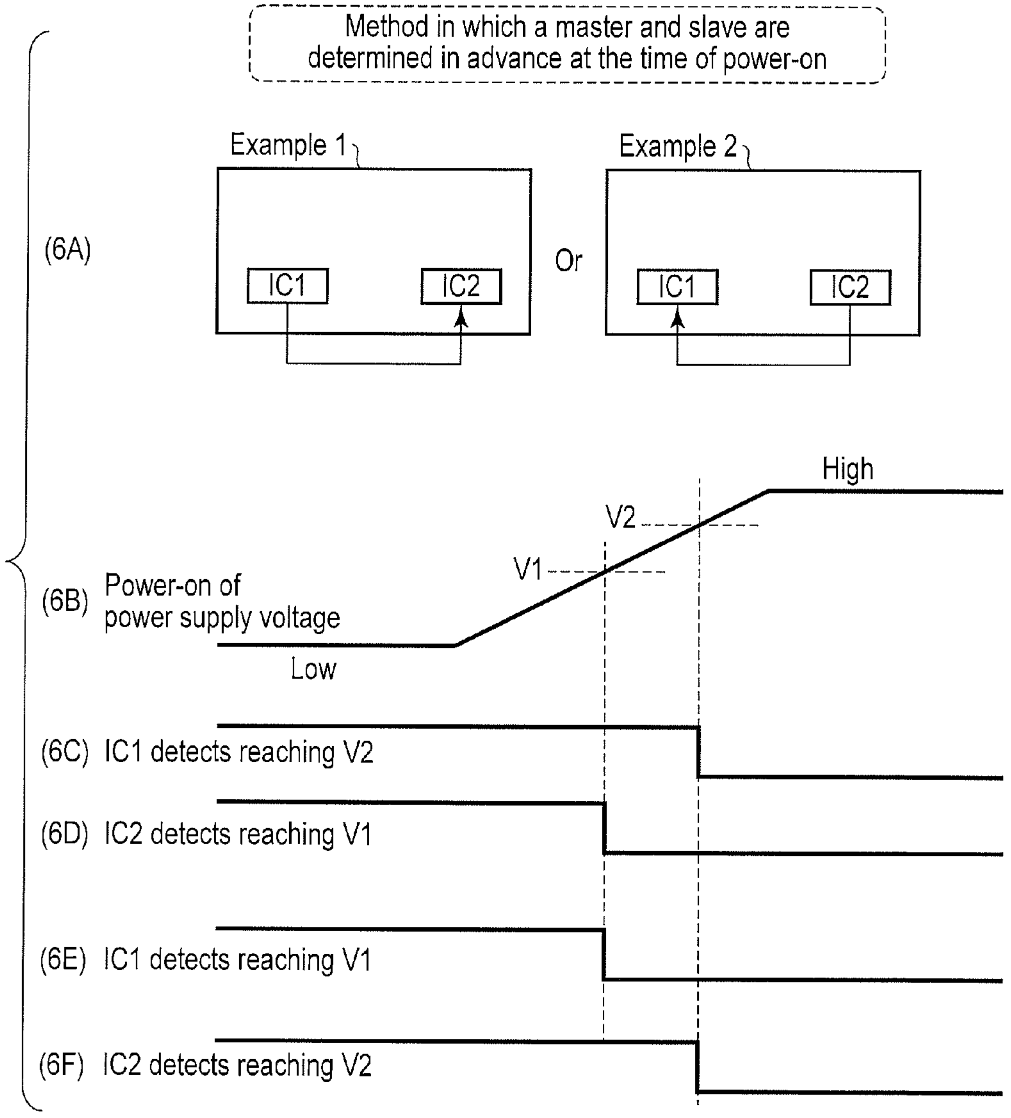
FIG. 6 is an operation explanatory view shown to explain the other operation example in the embodiment.

FIG. 6 shows an example in which a relationship between the master and slave is set to the liquid crystal display drivers IC1 and IC2 at the time of power-on. FIG. 6(6A) shows an example 1 in which the liquid crystal display driver IC1 is set to the master, and the liquid crystal display driver IC2 is set to the slave, and example 2 in which the liquid crystal display driver IC2 is set to the master, and the liquid crystal display driver IC1 is set to the slave.

FIG. 6(6B) shows a state where after the power is turned on, the power-supply of the voltage gradually rises from the low value to the high value.

FIG. 6(6C) and FIG. 6(6D) show an example in which the liquid crystal display driver IC2 detects earlier than the driver IC1 that the power supply voltage has reached set a potential V1 and, thereafter the liquid crystal display driver IC1 detects that the power supply voltage has reached a set potential V2. In such a case, the liquid crystal display driver IC1 is set to the master, and the liquid crystal display driver IC2 is set to the slave (example 1).

FIG. 6(6E) and FIG. 6(6F) show an example in which the liquid crystal display driver IC1 detects earlier than the driver IC2 that the power supply voltage has reached the set potential V1 and, thereafter the liquid crystal display driver IC2 detects that the power supply voltage has reached the set potential V2. In such a case, the liquid crystal display driver IC2 is set to the master, and the liquid crystal display driver IC1 is set to the slave (example 2).

That is, one liquid crystal display driver capable of detecting a singular state earlier is set to the master in advance at the time of power-on. In this case, setting of the one liquid crystal display driver to the master is carried out on condition that, regarding a change in the power supply voltage rising at the time of power-on, the one liquid crystal display driver has detected a threshold of a level higher than the threshold of a low level detected by the other liquid crystal display driver.

Figure 7:
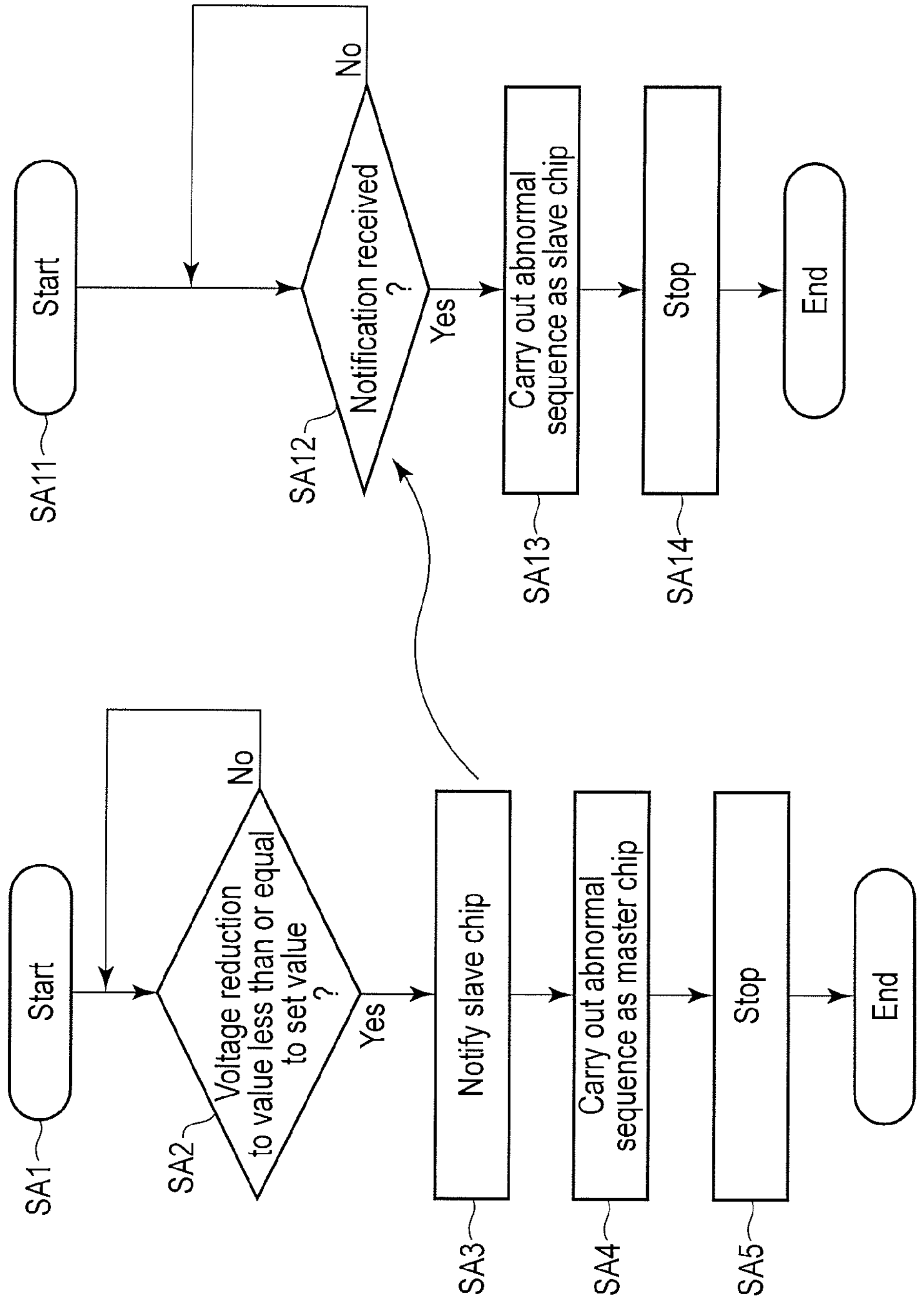
FIG. 7 is a flowchart corresponding to the operation shown in FIG. 5, and shows operation sequences on the master side and on the slave side.

FIG. 7 is a flowchart corresponding to the operations shown in FIG. 5, and shows the operation sequence of each of the master side and the slave side. When any one liquid crystal display driver detects whether or not the power supply voltage has fallen to a value less than or equal to the set value, the liquid crystal display driver (master chip) which has detected the fact notifies the detection of the fact to the other liquid crystal display driver (slave chip) (steps SA1, SA2, and SA3). Further, the master chip starts the abnormal sequence control (singular control). When the abnormal sequence control is completed, the master chip stops the operation thereof (steps SA4 and SA5).

The slave chip which has received the notification from the master chip starts the abnormal sequence control (singular control). Further, when the abnormal sequence control is completed, the slave chip stops the operation thereof (steps SA12, SA13, and SA14).

The abnormal sequence control (singular control) is to writing a black level signal (or signal making the hold voltages of pixels zero or bringing the hold voltages of the pixels into the off-state) to the pixels of the liquid crystal display panel all at once by utilizing, for example, the residual voltage remaining in the capacitor 252 of the booster circuit 251 to thereby realize a system stop operation. In this case, for example, the control switching elements CSW1 shown in FIG. 2 are turned on all at once, and all the gate lines G (G1 to Gn) are selected. Further, a signal of a predetermined level is output to the source lines all at once. This signal is a signal configured to discharge or cancel an electric charge of the retentive capacity of each pixel. Thereby, an accident which is the so-called burn-in of the liquid crystal display panel is prevented from occurring. Further, the state where an abrupt current flows from one liquid crystal display driver to the other liquid crystal display driver or a large potential difference occurs between the gate lines in the display area to thereby cause a failure is prevented from being brought about. It should be noted that the abnormal sequence control (singular control) includes carrying out the system stop operation by utilizing the voltage of the capacitor 342 of the regulator 341.

Figure 8:
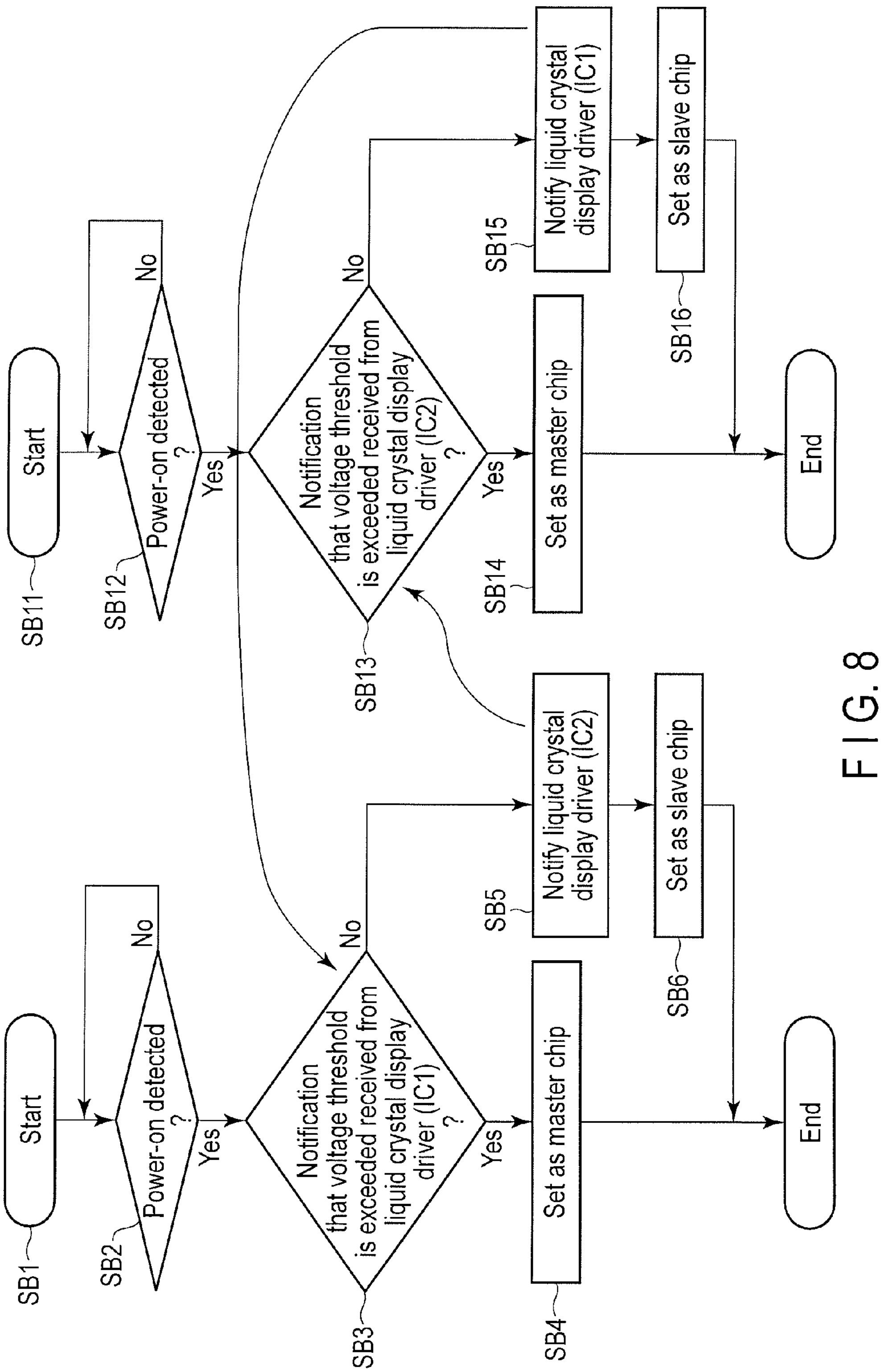

FIG. 8 is a flowchart corresponding to the operations shown in FIG. 6, and shows the operation sequence to be carried out when the master side and the slave side are set in advance at the time of power-on. It is detected whether or not the power has been turned on (steps SB1 and SB2 or SB11 and SB12).

Next, it is determined whether or not a notification that the voltage threshold is exceeded has been received from the other liquid crystal display driver (step SB3 or SB13).

Here, if one liquid crystal display driver A has received the aforementioned notification from the other liquid crystal display driver B earlier in terms of time, this means that the voltage threshold of the other liquid crystal display driver is less than the voltage threshold of the one liquid crystal display driver. The above implies that the one liquid crystal display driver A has a higher threshold than the other liquid crystal display driver B. In this case, when the battery has become detached, the one liquid crystal display driver A can detect the falling off of the battery earlier than the other liquid crystal display driver B.

That is, at the time of power-on, the liquid crystal display driver which has received the aforementioned notification earlier is set as the master chip (steps SB3 and SB4 or SB13 and SB14) and, when the above-mentioned liquid crystal display driver has not received the notification, the liquid crystal display driver is set as the slave chip (steps SB3, SB5, and SB6 or SB13, SB15, and SB16).

Figure 9:
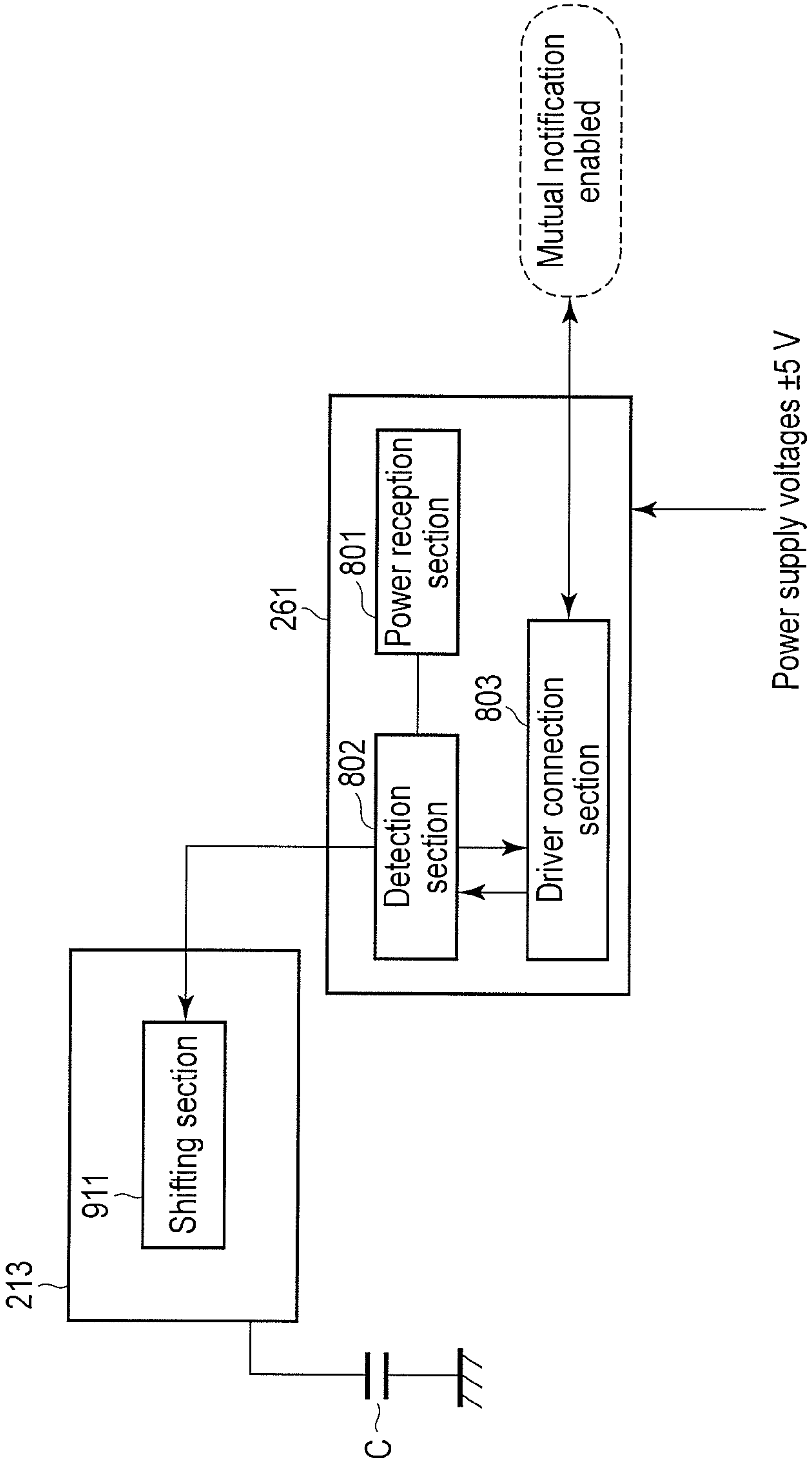
FIG. 9 shows an example of one characteristic configuration block provided in a liquid crystal display driver IC1 in an extracting manner.

FIG. 9 shows a characteristic configuration block provided in each of the above-mentioned liquid crystal display driver IC1 and the liquid crystal display driver IC2 in an extracting manner.

The voltage reduction detection circuits 261 and 361 have an identical configuration, and hence FIG. 9 shows, in the voltage reduction detection circuit 261 in one liquid crystal display driver IC1, the circuit on the booster circuit 251 side as a representative. The power supply voltages ±5V from the battery 500 are input to a power reception section 801 and are monitored by a detection section 802. The detection section 802 can detect the singular state where the voltage of the battery has fallen to a value less than or equal to the predetermined voltage value. Upon detection of the singular state, the detection section 802 notifies a shifting section 911 in the timing controller 213 that the singular state has been detected. Further, the detection section 802 notifies voltage reduction detection circuit 361 in the other liquid crystal display driver IC2 through a driver connection section 803 that the singular state has occurred. Thereby, the operation of the shifting section is started also in the other liquid crystal display driver IC2.

When notified that the singular state has occurred, the shifting section 911 executes the singular control of the liquid crystal display device. The singular control is that the n control switching elements CSW1 shown in FIG. 2 for example, are turned on all at once and, writing of for example, the black level pixel signal to all the pixels PX is executed. Further, as a voltage used for the operation, for example, a voltage remaining in the capacitor C of the booster circuit is utilized.

Thereby, it is possible to prevent burn-in of the liquid crystal panel from occurring, and prevent a failure or a breakage of the semiconductor circuit in the liquid crystal display driver from occurring.

It should be noted that the singular control is not limited to the abnormal sequence operation and, for example, a detection signal may further be notified to the application processor 400. The application processor 400 may execute saving of data being processed or storage and the like of a data read address on the basis of this detection signal. Further, as the voltage for the power supply to be used at this time, the voltage of the capacitor connected to the booster circuit or the voltage of the capacitor connected to the regulator may be utilized.

In the above embodiment, writing of a black level pixel signal to all the pixels PX has been carried out through the gate circuit at the time of the singular operation. As the driving method to be employed in this case, a first method in which the black level pixel signal is written while continuously supplying a common voltage to the common electrode, and a second method in which the black level pixel signal is written in a state where the common voltage of the common electrode is in a residual capacity voltage state, because of stoppage of the voltage supply to the common electrode for the purpose of voltage saving, are available. In this device, any one of the first and second methods may be employed.

In the case of the second method, the description has been given assuming that the common electrode connected to the liquid crystal display driver IC1 side is opposed to both the pixel electrodes on the liquid crystal display driver IC1 side, and the pixel electrodes on the liquid crystal display driver IC2 side. Accordingly, when liquid crystal display driver IC1 has detected reduction of the power supply voltage, and has shifted to the singular operation, notification of the fact is given to the liquid crystal display driver IC2 side a little later. Accordingly, the liquid crystal display driver IC2 shifts to the singular operation a little later than the liquid crystal display driver IC1.

For this reason, it is feared when the liquid crystal display driver IC2 has shifted to the singular operation whether or not the potential of the common electrode is sufficiently maintained. However, in this embodiment, there is a time lag between the change in the residual capacity potential of the common electrode, and residual capacity change of the capacitor of the booster circuit or the regulator, and hence the time to be used by the liquid crystal display driver IC2 to complete the singular operation is sufficiently secured.

Figure 10:
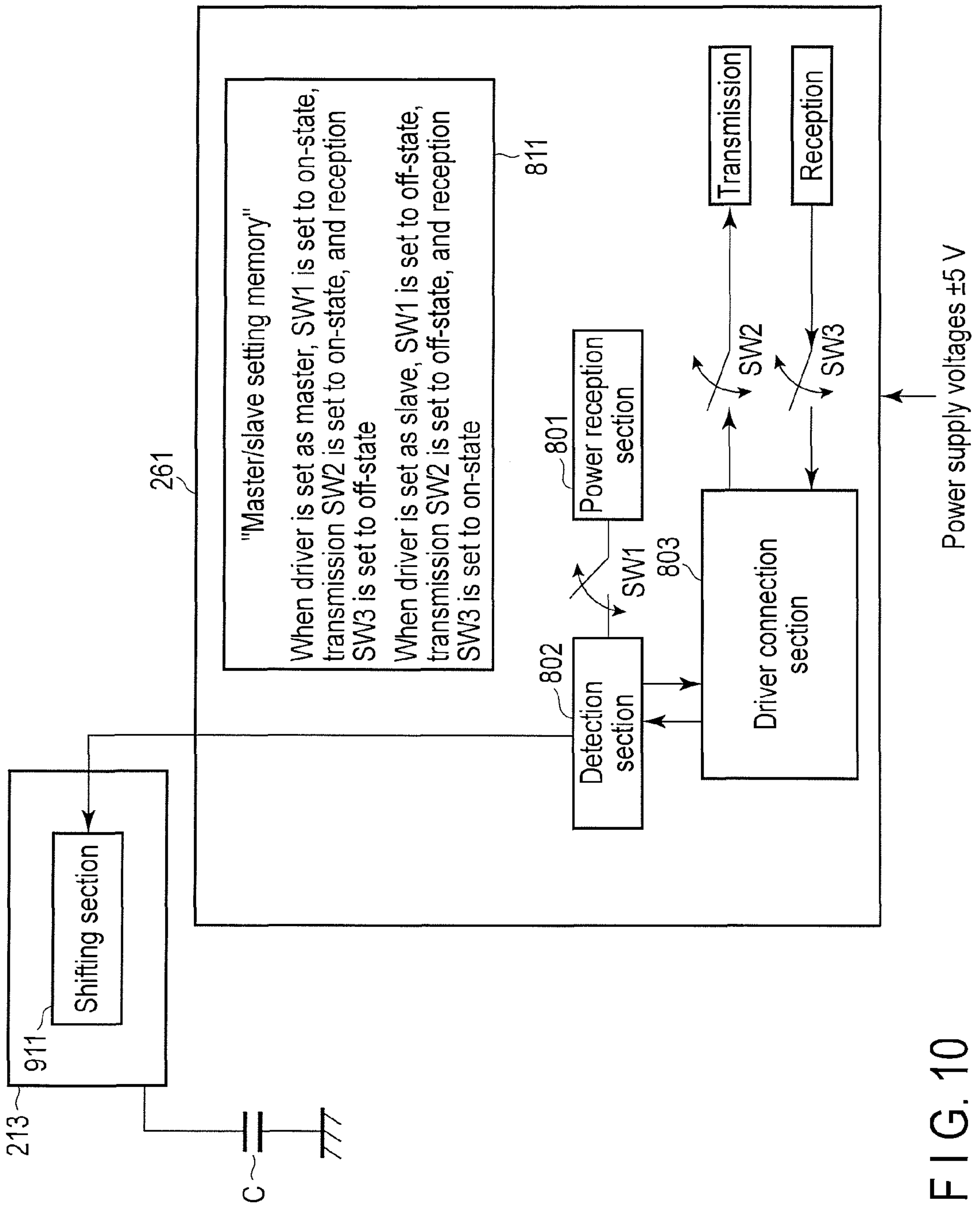
FIG. 10 shows the other example of a characteristic configuration block provided in a liquid crystal display driver IC1 in an extracting manner.

FIG. 10 shows another example of the characteristic configuration block provided in each of the liquid crystal display driver IC1, and the liquid crystal display driver IC2. In this embodiment, a switch SW1 is provided between the detection section 802 and power reception section 801. Further, a transmission line, and a reception line are provided between the driver connection section 803 and the driver connection section of the other liquid crystal display driver, and the transmission line and the reception line include switches SW2, and SW3, respectively.

Further, a setting memory 811 configured to store therein the statuses of the liquid crystal display drivers is provided. The setting memory 811 stores therein a control signal used to control the switches SW1 to SW3. When the liquid crystal display driver is set as the master as described in connection with FIG. 8, the switches SW1 and SW2 are set to the on-state, and the switch SW3 is set to the off-state (a function capable of instructing the partner liquid crystal display driver to make a notification is set). Conversely, when the liquid crystal display driver is set as the slave, the switches SW1 and SW2 are set to the off-state, and the switch SW3 is set to the on-state (a function of waiting for a notification from the partner liquid crystal display driver is set).

Regarding the liquid crystal display panel, a configuration compatible with the fringe field switching (FFS) system may be employed, and a configuration compatible with other display modes such as the in-plane switching (IPS) system, vertical alignment (VA) system, and the like may also be employed.

Further, although the liquid crystal display panel includes an in-cell type touch panel, it is a matter of course that the touch panel of the embodiment may be one of the mutual capacitance touch panel and self-capacitance touch panel.

In the above-mentioned embodiment, normally, reduction of the power supply voltage of the booster circuit 251 side or the booster circuit 351 side is detected earlier than the power supply voltage reduction of the regulator side. Thereby, it is possible to execute the singular control operation (abnormal sequence) by utilizing the voltage of the smoothing capacitor connected to the booster circuit 251 or the booster circuit 351 as the power supply voltage. At this time, the voltage accumulated in the smoothing capacitor of the regulator side may also be utilized at the same time.

Here, there may be a case where threshold detection of the power supply voltage of the booster circuit side is overlooked for some reason or a case where the threshold detection cannot be carried out owing to disconnection or the like. In such a case, in this device, it is also possible to execute the singular control operation (abnormal sequence) by utilizing the voltage accumulated in the smoothing capacitor of the regulator side on the basis of the control of the regulator side.

That is, the voltage reduction detection sections 261 and 361 also detect a change in voltage of the regulators 241 and 341 as described in connection with FIG. 5 or FIG. 6, and set one of the liquid crystal display driver IC1 and the liquid crystal display driver IC2 as the master, and the other as the slave. Further, when the voltage reduction detection circuit 261 or 361 detects that the input voltage of regulator 241 or 341 has become less than or equal to the set value, it is possible to execute the singular control operation as in the case described in connection with FIG. 9.

In this case, a switch which can connect, in series, the plurality of smoothing capacitors connected to the regulators 241 and 341 may be turned on to thereby raise the accumulated power supply voltage, and this voltage may be utilized for the singular control operation. Further, at this time, outputs of the plurality of boosting and smoothing capacitors used for booster circuits 251 and 351 may also be jointly used.

Abnormality detection of the above-mentioned regulator 241 or 341 is accepted by the shifting section 911 of the timing controller 213. However, the device is designed in such a manner that when the shifting section 911 has already accepted abnormality detection from the booster circuit 251 or 351, and has shifted to the singular control operation, any abnormality detection from the regulator 241 or 341 is negated.

In the above-mentioned embodiment, each of the voltage reduction detection circuits 261 and 361 is constituted in each of the liquid crystal display drivers IC1 and IC2. However, each of the voltage reduction detection circuits may independently be constituted outside each of liquid crystal display drivers IC1 and IC2. Further, when the voltage reduction detection circuit has detected voltage reduction of the battery, a notification signal may be supplied to each liquid crystal display driver. It should be noted that it is a matter of course that in the liquid crystal display driver, one master, and a plurality of slaves may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device including a plurality of liquid crystal display drivers, each of the plurality of liquid crystal display drivers comprising:

a power reception section electrically connected to a battery side, and configured to receive supply of power;

a detection section configured to detect a singular state where a voltage of the battery side has fallen to a value less than or equal to a predetermined voltage value;

a shifting section configured to receive a detection output of the singular state from the detection section to thereby shift to singular control; and a driver connection section configured to electrically connect the plurality of drivers to each other, wherein, if the detection section in one of the liquid crystal display drivers has detected the singular state, the shifting section corresponding to the detection section executes the singular control, the driver connection section corresponding to the detection section notifies the other liquid crystal display driver that the singular state has been detected to thereby cause the singular control of the other liquid crystal display driver to be started, and as the voltage used by the shifting section to execute the singular control, a voltage of a capacitor of a booster circuit of the one liquid crystal display driver is utilized.

2. The liquid crystal display device according to claim 1, wherein the one liquid crystal display driver which has detected the singular state earlier than the other is made a master, the other liquid crystal display driver is made a slave, and the driver connection section notifies the other liquid crystal display driver which is the slave of the singularity detection of the master.

3. The liquid crystal display device according to claim 1, wherein the one of the liquid crystal display drivers which has detected the singular state earlier than the other is already set in advance as the master at the time of power-on, and setting of the one of the liquid crystal display drivers as the master is carried out on condition that the one the liquid crystal display drivers has detected a threshold of a level higher than a threshold of a low level detected by the other liquid crystal display driver.

4. The liquid crystal display device according to claim 1, wherein the one of the liquid crystal display drivers is a chip of one integrated circuit, and the other liquid crystal display driver is a plurality of chips of a plurality of integrated circuits.

5. The liquid crystal display device according to claim 1, wherein the shifting section writes a signal of a black level to all rows of a liquid crystal display panel all at once as the singular control.

6. The liquid crystal display device according to claim 1, wherein an application processor configured to supply video data, and a synchronization signal to the plurality of liquid crystal display drivers is connected to the liquid crystal display device.

7. A driving method of a liquid crystal display device, wherein each of a plurality of liquid crystal display drivers comprises a power reception section configured to receive a power supply from a battery side, a detection section configured to detect a singular state, a shifting section, and a driver connection section configured to electrically connect the plurality of liquid crystal display drivers to each other, the method comprising:

in one of the liquid crystal display drivers, receiving supply of power from the battery side;

detecting a singular state where a voltage of the battery side has fallen to a value less than or equal to a predetermined voltage value;

executing, if a detection output of the singular state is received, singular control by the shifting section corresponding to the detection section, and notifying, by the driver connection section, the other liquid crystal display driver that the singular state has been detected to thereby cause the singular control of the other liquid crystal display driver to be started, wherein as the voltage used by the shifting section to execute the singular control, a voltage of a capacitor of a booster circuit of the one liquid crystal display driver is utilized.

8. The driving method of a liquid crystal display device according to claim 7, wherein the shifting section writes a signal of a black level to all rows of a liquid crystal display panel all at once as the singular control.

9. A liquid crystal display device comprising:

a liquid crystal display panel in which two-dimensionally arranged pixel circuits are controlled by a source selection circuit, gate circuits, and a common electrode drive circuit;

a plurality of liquid crystal display drivers electrically connected to a battery side to receive a power supply, and configured to drive the liquid crystal display panel; and an application processor configured to supply video data, and a synchronization signal to the plurality of liquid crystal display drivers, wherein each of the plurality of liquid crystal display drivers includes a power reception section electrically connected to the battery side, and configured to receive the power supply, a detection section configured to detect a singular state where a voltage of the battery side has fallen to a value less than or equal to a predetermined voltage value, a shifting section configured to receive a detection output of the singular state from the detection section to thereby shift to singular control, and a driver connection section configured to electrically connect the plurality of drivers to each other, if, in one of the liquid crystal display drivers, the detection section has detected the singular state, the shifting section corresponding to the detection section executes the singular control, and the driver connection section notifies the other liquid crystal display driver that the singular state has been detected to thereby cause the singular control of the other liquid crystal display driver to be started, and as the voltage used by the shifting section to execute the singular control, a voltage of a capacitor of a booster circuit of the one liquid crystal display driver is utilized.

* * * * *